H. E. RUPP.
CORN SNAPPING AND HUSKING ROLLS.
APPLICATION FILED APR. 25, 1914.
1,123,806.
Patented Jan. 5, 1915.
2 SHEETS—SHEET 1.
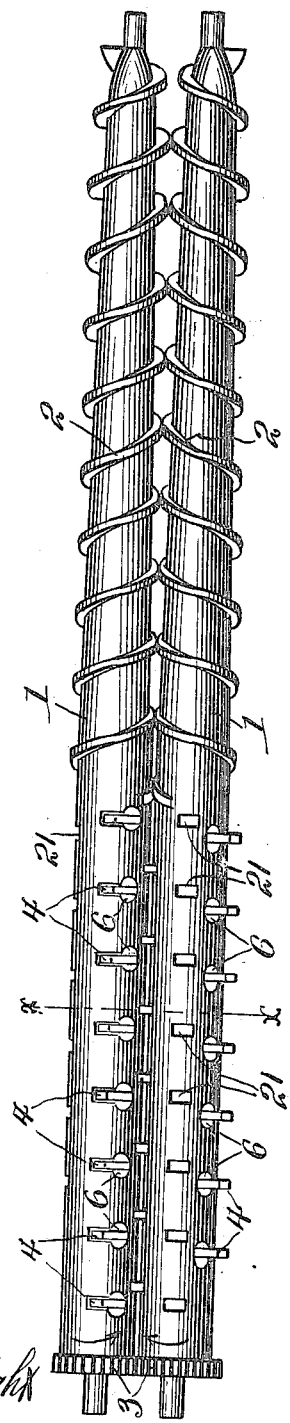
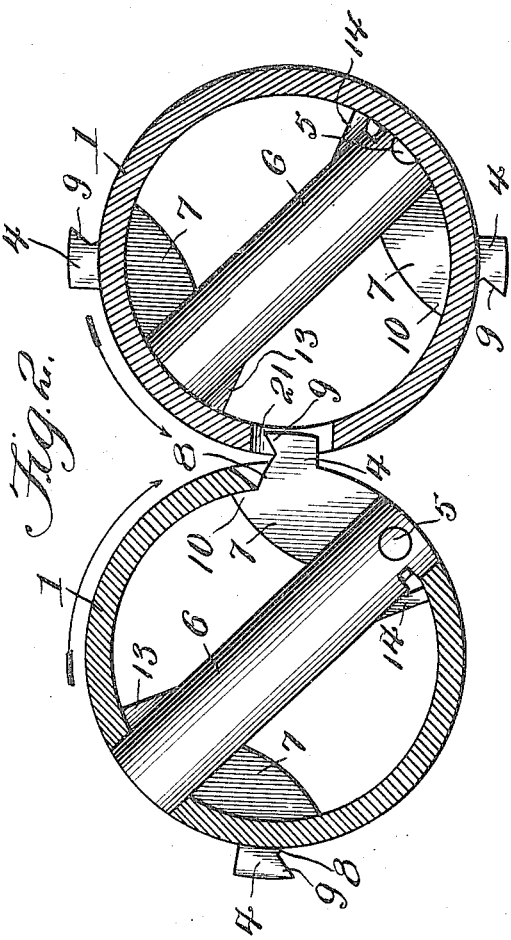
Inventor
H. E. Rupp.
By Victor J. Evans
Attorney
Witnesses
J. T. L. Wright
V. B. Hillyard.
THE NORRIS PETERS CO., PHOTO-LITHO., WASHINGTON, D. C.

H. E. RUPP.
CORN SNAPPING AND HUSKING ROLLS.
APPLICATION FILED APR. 25, 1914.

1,123,806.

Patented Jan. 5, 1915.
2 SHEETS—SHEET 2.

Witnesses
J. T. L. Wright
V. B. Hillyard

Inventor
H. E. Rupp
By Victor J. Evans
Attorney

UNITED STATES PATENT OFFICE.

HERBERT E. RUPP, OF WEST BROOK, MINNESOTA, ASSIGNOR OF ONE-HALF TO HENRY D. RUPP, OF WEST BROOK, MINNESOTA.

CORN SNAPPING AND HUSKING ROLLS.

1,123,806.  Specification of Letters Patent.  Patented Jan. 5, 1915.

Application filed April 25, 1914. Serial No. 834,399.

*To all whom it may concern:*

Be it known that I, HERBERT E. RUPP, a citizen of the United States, residing at West Brook, in the county of Cottonwood and State of Minnesota, have invented new and useful Improvements in Corn Snapping and Husking Rolls, of which the following is a specification.

The invention has relation to rolls for corn harvesters being designed most especially for snapping ears of corn from the stalks and subsequently removing the husks, the rolls being of such construction as to leave the stalks standing in the field while removing the ears therefrom.

The invention relates most especially to the husking mechanism whereby the ears are divested of their covering without injury resulting to the grain or the latter detached from the ears.

The invention furthermore has for its object to combine with rolls husking means which may be readily placed in position or removed and which in operation will strip the husks from the ears without loosening the grain or injuring the same.

A further purpose of the invention is the provision of the husking means which operate automatically and by centrifugal action thereby enabling the operation of the husking devices to be effectively controlled by regulating the speed of the husking rolls.

The invention consists of the novel features, details of construction and combination of parts, which hereinafter will be more particularly set forth, illustrated and claimed.

Figure 3:
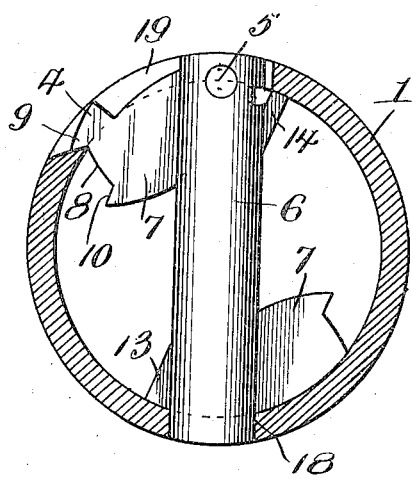
Figure 4:
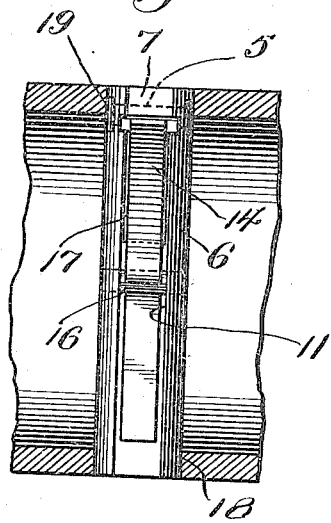
Figure 5:
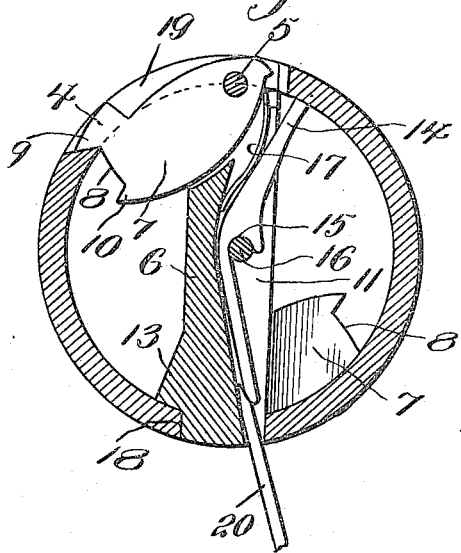
Figure 6:
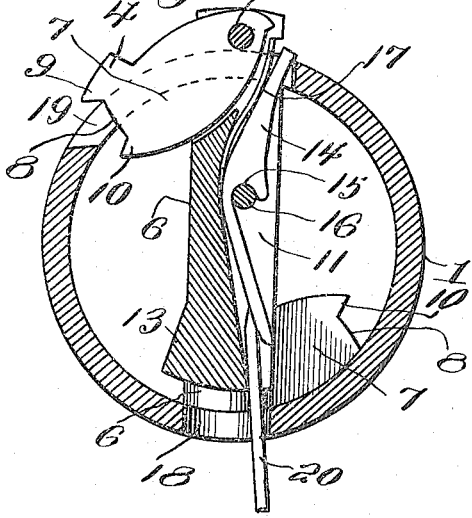

In the drawings hereto attached:—Figure 1 is a top plan view of a pair of snapping and husking rolls for corn harvesters embodying the invention. Fig. 2 is a section on the line x—x of Fig. 1 showing the parts on a larger scale. Fig. 3 is an enlarged section of one of the husking rolls showing the husking tooth in retracted position. Fig. 4 is an edge view of one of the springs for a husking tooth showing the latter and adjunctive parts in position. Fig. 5 is a section on the line y—y of Fig. 4. Fig. 6 is a detail view showing the manner of operating the locking device to admit of placing the support in position or removing it from a roll.

Corresponding and like parts are referred to in the following description, and indicated in all the views of the drawing, by the same reference characters.

The husking rolls are provided in pairs and are adapted to be rotated in reverse directions. In practice the husking rolls 1 are of similar formation and are preferably hollow, the snapping ends being tapered and the husking ends of uniform diameter. The snapping ends of the rolls are provided with spiral flights 2 which engage with the stalks and positively move the same between the rolls and effect a snapping or separation of the ears therefrom. The husking ends of the rolls are provided with husking teeth which are yieldable so as to prevent injury to the grain or the loosening of the grain from the ears. The rolls may be mounted in any manner and are connected at one end by means of spur gears 3 which cause the rolls to revolve at a uniform speed and in reverse directions. The rolls may have any relative arrangement and are usually placed with the snapping ends foremost.

The husking teeth are indicated at 4 and are yieldable so as to move inward when coming in contact with the grain, thereby preventing injury to such grain or the loosening of the same from the ears. The teeth besides being yieldable are readily detachable from the rolls and are pivoted at 5 to supports 6. Each of the teeth 4 has a body portion 7 which is located within the roll and is pivoted at one end as indicated at 5 and has its opposite end notched at 8 whereby stops 9 and 10 are formed to limit the movements of the tooth. When the tooth is moved inward to its utmost limit a small portion of the edge projects as indicated most clearly in Fig. 3 and when the tooth is thrown outward to the limit of its movement the maximum portion projects. The stop 9 limits the inward movement of the tooth and the stop 10 its outward movement.

Each tooth is pivoted by means of its body 2 and end of a support 6 which preferably consists of a bar having a groove 11 formed in one side. The end of the support 6 receiving the body of the tooth is notched and receives a pin 12 upon which the body of the tooth is pivotally mounted. A projection 13 is formed upon a side of the support 6 at the end opposite that receiving the tooth and such projection constitutes a stop to limit the movement of the support in one direction when placing the same in position.

The support is held from movement in the opposite direction by means of a lock 14 which is arranged to engage the inner side of the hollow roll 1. The lock 14 consists of a bar which is formed at a central point with a shoulder 15 which engages a pin 16 fitted in a transverse opening of the support and extending across the groove 11. The end portions of the bar comprising the lock 14 are oppositely inclined, hence such bar has a limited rocking movement upon the pin 16. A spring 17 arranged in one end of the groove 11 and secured to the support 6 exerts an outward pressure upon one end of the lock 14 to normally hold it projected beyond the grooved side of the bar 6 so as to engage the inner side of the roll 1 and thereby act jointly with the stop 13 to retain the support or bar 6 in place when properly positioned within the roll. Each of the rolls 1 is provided at intervals in its length with opposed openings 18 and 19. The openings 18 correspond with the outline of the end of the parts 6 having the projection 13 whereas the openings 19 are elongated to receive the opposite ends of the parts 6 and the teeth pivoted thereto. Inasmuch as the parts 6 are usually round and the teeth flat, the openings 19 present a keyhole shape. When it is required to remove any one of the supports and the tooth pivoted thereto a suitable instrument, as 20, is introduced into the groove 11 and in the rear of the end of the lock located therein to admit of such end of the lock being pried outward, whereby the end in engagement with the roll is caused to enter the groove 11 thereby admitting of removing the part 6 by an outward movement through the opening 19. Each of the rolls 1 is formed with openings 21 in position to receive the projecting ends of the teeth thereby preventing such teeth from being pressed inward by coming in contact with a part of the roll.

It is to be understood that the husking teeth are projected by centrifugal action and by rotating the rolls at a greater or less speed it is possible to control the action of the teeth whereby they will offer a greater or less resistance to the repressive action of the ears of corn coming in contact therewith and as a result the teeth may be caused to project so as to effectively remove the husks without in any manner injuring the grain or loosening the same from the ear. It is also understood that husking teeth embodying the invention may be applied wholly to rolls designed solely for husking purposes.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the invention as claimed.

Having thus described the invention, what is claimed as new is:—

1. In combination with a roll, teeth having elongated bodies which are pivotally connected at one end within the roll and are formed at their opposite ends with stops to limit the pivotal movement of the teeth, said teeth being adapted to be projected at one end from said roll by means of centrifugal force.

2. In combination, a hollow roll having opposed openings, a support removably fitted within the roll and insertible through the opposed openings and a tooth pivoted to such support and adapted to project at one end thereof beyond the roll.

3. In combination, a hollow roll having opposed openings, a support removably fitted within the roll and adapted to have its end portions fitted in the opposed openings thereof, a stop at one end of the support to limit the movement of such support in one direction, a movable lock mounted upon such support and adapted to engage the inner side of the roll to limit the movement of the support in the opposite direction and a tooth carried by such support and adapted to project at one end thereof beyond the roll.

4. In combination, a hollow roll having opposed openings, a support removably fitted within the roll and having its end portions fitted in the opposed openings thereof, a stop at one end of the support, a lock pivotally mounted upon the support and a tooth carried by the support and adapted to project at one end thereof beyond the roll.

5. In combination, a hollow roll having opposed openings, a support grooved along one side and provided near one end with a projection, a lock bar having its end portions oppositely inclined and fitted in the groove of the support and pivoted thereto and a tooth pivotally mounted upon an end of the support and adapted to project at one end thereof through an opening of the roll.

In testimony whereof I affix my signature in presence of two witnesses.

HERBERT E. RUPP.

Witnesses:
AL. O. IVERSON,
JOSEPH BUDISH.